United States Patent
Zou et al.

(10) Patent No.: US 10,642,088 B2
(45) Date of Patent: May 5, 2020

(54) LIQUID CRYSTAL DISPLAY PANEL, DISPLAY DEVICE AND DISPLAY METHOD

(71) Applicant: BOE TECHNOLOGY GROUP CO., LTD., Beijing (CN)

(72) Inventors: Xiangxiang Zou, Beijing (CN); Zezhou Yang, Beijing (CN); Xiaolong Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/043,773

(22) Filed: Jul. 24, 2018

(65) Prior Publication Data

US 2019/0204663 A1 Jul. 4, 2019

(30) Foreign Application Priority Data

Jan. 3, 2018 (CN) .......................... 2018 1 0003784

(51) Int. Cl.
G02F 1/1335 (2006.01)
G02F 1/017 (2006.01)
G02F 1/13357 (2006.01)

(52) U.S. Cl.
CPC .. G02F 1/133509 (2013.01); G02F 1/133528 (2013.01); G02F 1/133555 (2013.01); *G02F 2001/01791* (2013.01); *G02F 2001/133616* (2013.01)

(58) Field of Classification Search
CPC ......... G02F 2001/133616; G02F 2001/133614
See application file for complete search history.

(56) References Cited

U.S. PATENT DOCUMENTS

| 2002/0047953 A1* | 4/2002 | Endo | G02B 6/0021 349/58 |
| 2002/0180908 A1* | 12/2002 | Ariyoshi | G02F 1/133615 349/113 |
| 2008/0106672 A1* | 5/2008 | Kim | G02B 5/3058 349/62 |
| 2014/0204128 A1* | 7/2014 | Jiang | G02F 1/133617 345/690 |
| 2016/0357068 A1* | 12/2016 | Yang | G02F 1/133504 |
| 2017/0199423 A1* | 7/2017 | Cheng | G02B 6/0023 |
| 2018/0292713 A1* | 10/2018 | Drolet | G02F 1/133611 |

(Continued)

FOREIGN PATENT DOCUMENTS

| CN | 1424616 A | 6/2003 |
| CN | 203587926 U | 5/2014 |
| CN | 104330918 A | 2/2015 |

(Continued)

OTHER PUBLICATIONS

First Office Action for CN Appl. No. 201810003784.1, dated Dec. 31, 2019.

*Primary Examiner* — Alexander P Gross
(74) *Attorney, Agent, or Firm* — Foley & Lardner LLP

(57) ABSTRACT

The present disclosure relates to a liquid crystal display panel, a display device, and a display method. The liquid crystal display panel includes: a first substrate and a second substrate opposed to each other; a liquid crystal layer located between the first substrate and the second substrate; and a quantum dot layer located on a side of the second substrate away from the liquid crystal layer, and including a plurality of quantum dots of different dimensions.

17 Claims, 3 Drawing Sheets

(56) References Cited

U.S. PATENT DOCUMENTS

2019/0204672 A1* 7/2019 Choi ................ G02F 1/133512

FOREIGN PATENT DOCUMENTS

| CN | 104614785 A | 5/2015 |
| CN | 105144275 A | 12/2015 |
| CN | 105223724 A | 1/2016 |
| CN | 105353556 A | 2/2016 |
| CN | 106773281 A | 5/2017 |

* cited by examiner

LIQUID CRYSTAL DISPLAY PANEL, DISPLAY DEVICE AND DISPLAY METHOD

CROSS-REFERENCE TO RELATED APPLICATIONS

This application claims priority to Chinese Patent Application No. 201810003784.1 filed on Jan. 3, 2018, the disclosure of which is incorporated hereby as a whole into the present disclosure.

TECHNICAL FIELD

The present disclosure relates to the technical field of display, and partially to a liquid crystal display panel, a display device, and a display method.

BACKGROUND

With the rapid development of display technologies, people have higher and higher requirements for the performance of display products. Because of a series of excellent characteristics such as light weight, low energy consumption, flexibility, liquid crystal display panel, as an important basis of the display device, gains extensive attention.

The current liquid crystal display panel has a generally low display contrast (dozens to one), and a low color gamut (about 30%).

SUMMARY

According to a first aspect of the embodiments of the present disclosure, a liquid crystal display panel is provided, comprising: a first substrate and a second substrate opposed to each other, a liquid crystal layer located between the first substrate and the second substrate, and a quantum dot layer located on a side of the second substrate away from the liquid crystal layer, and comprising a plurality of quantum dots of different dimensions.

In some embodiments, the liquid crystal display panel further comprises: a light guide layer located on a side of the quantum dot layer away from the liquid crystal layer, and configured to guide light into the quantum dot layer.

In some embodiments, the light is blue or ultraviolet light with a single wavelength, for making the quantum dots in an excited state.

In some embodiments, the liquid crystal display panel further comprises: a protective layer located on a side of the quantum dot layer away from the liquid crystal layer, and configured to reduce the blue or ultraviolet light emitted from the liquid crystal display panel.

In some embodiments, the liquid crystal display panel further comprises a filter layer located between the quantum dot layer and the liquid crystal layer, wherein the filter layer comprises a first filter pattern, a second filter pattern, and a third filter pattern.

In some embodiments, the quantum dot layer comprises a first region, a second region and a third region, positions of which correspond to positions of the first filter pattern, the second filter pattern and the third filter pattern respectively, and the dimensions of the quantum dots in the first region, the second region and the third region respectively correspond to a wavelength of the light capable of passing through the first filter pattern, the second filter pattern and the third filter pattern.

In some embodiments, orthographic projections of the first region, the second region and the third region on a plane of the first substrate respectively coincide with orthographic projections of the positions those of the first filter pattern, the second filter pattern and the third filter pattern on a plane of the first substrate.

In some embodiments, the liquid crystal display panel further comprises: a reflective layer located on a side of the liquid crystal layer away from the filter layer.

In some embodiments, the reflective layer is metal wire grids.

In some embodiments, a material for the first substrate comprises a reflective metal material.

In some embodiments, the liquid crystal display panel further comprises a transflective layer located on a side of the liquid crystal layer away from the filter layer.

In some embodiments, the liquid crystal display panel further comprises a transmissive layer located on a side of the liquid crystal layer away from the filter layer.

In some embodiments, a material for the quantum dots comprises at least one selected from a group consisting of IV, II-VI, III-V, and IV-VI group elements.

In some embodiments, the liquid crystal display panel further comprises polarizer layers respectively located on opposite sides of the liquid crystal layer.

According to a second aspect of the embodiments of this disclosure, a display device is provided, comprising the liquid crystal display panel according to any of the embodiments described above.

In some embodiments, the display device further comprises: a first light source, located on a side of the second substrate away from the liquid crystal layer, and configured to emit blue or ultraviolet light with a single wavelength.

In some embodiments, the display device further comprises: a second light source, located on a side of the first substrate away from the liquid crystal layer, and configured to emit white light.

In some embodiments, the display device further comprises: a third light source, located on a side of the first substrate away from the liquid crystal layer, and configured to alternately emit white light and blue or ultraviolet light with a single wavelength.

According to a third aspect of the embodiments of this disclosure, a display method of the liquid crystal display panel according to any of the embodiments described above is provided, comprising: making the quantum dots in the quantum dot layer in an excited state; and causing the liquid crystal display panel to display an image.

In some embodiments, the quantum dot layer is illuminated by the blue or ultraviolet light with a single wavelength, to make the quantum dots in an excited state.

Further features of the present disclosure and advantages thereof will become apparent from the following detailed description of exemplary embodiments with reference to the attached drawings.

BRIEF DESCRIPTION OF THE DRAWINGS

The accompanying drawings, which constitute a part of the specification, illustrate the embodiments of the present disclosure and, together with the description, serve to explain the principles of the present disclosure.

The present disclosure will be understood more clearly according to the following detailed description with reference to the accompanying drawings.

Please be appreciated that, the sizes of various portions shown in the accompanying drawings are not drawn to actual scale. Furthermore, identical or similar reference numerals are used to refer to identical or similar members.

DETAILED DESCRIPTION

Figure 1:
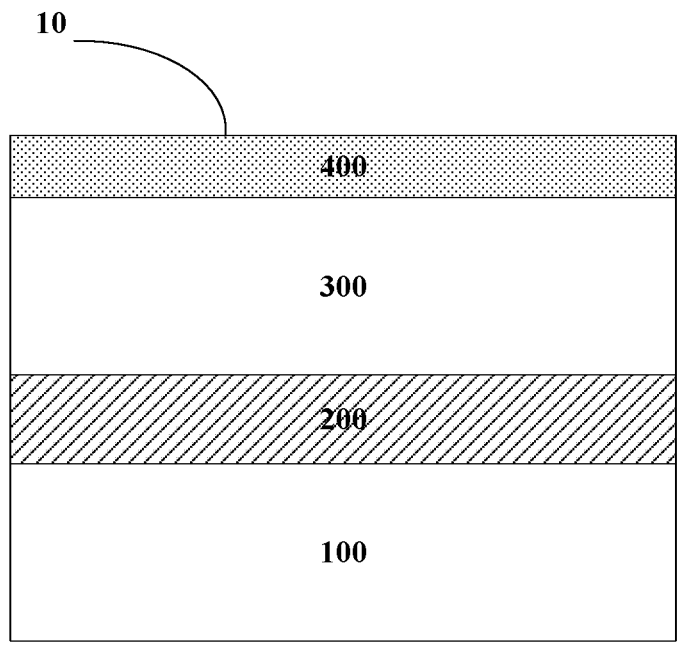
FIG. 1 is a schematic diagram showing a structure of a liquid crystal display panel according to some embodiments of the present disclosure.

Various exemplary embodiments of the present disclosure will be described in detail with reference to the accompanying drawings in the following. The following description of the exemplary embodiments is merely illustrative in nature and is in no way intended to limit this disclosure, its application, or uses. The present disclosure may be implemented in many different forms and is not limited to the embodiments described herein. These embodiments are provided merely for making the present disclosure thorough and complete, and sufficiently expressing the scope of the present disclosure to one of ordinary skill in the art. It should be noted that the relative arrangement of the components and steps, compositions of materials, the numerical expressions, and numerical values set forth in these embodiments are interpreted to be merely illustrative instead of restrictive, unless it is specifically stated otherwise.

The words "first", "second" and the like used in the present disclosure do not imply any sequence, number or importance, but are merely used to distinguishing different portions. The word "comprise" or "include" or the like means that an element preceding the word covers elements listed following the word, but does not preclude the possibility of covering also other elements. The terms "up", "down", "left", "right" and the like are merely used for implying relative position relations, and after an absolute position of the object described changes, the relative position relation may possibly change correspondingly.

In this disclosure, when a specific device is described between a first device and a second device, an intermediate device may exist between the specific device and the first device or the second device, or an intermediate device may not exist. When a specific device is described to be connected to another device, the specific device may be directly connected with the another device without an intermediate device, or it may not be directly connected with the another device but has an intermediate device.

All terms (including technical or scientific terms) used in this disclosure have the same meanings as understood by one of ordinary skill in the art, unless otherwise specifically defined. It should also be understood that the terms defined in common dictionaries should be interpreted as having meanings consistent with their meanings in the context of the relevant technologies, but should not be interpreted with idealized or extremely formalized meanings, unless otherwise expressly defined herein.

Techniques, methods and apparatus as known by one of ordinary skill in the relevant art may not be discussed in detail, but are intended to be regarded as a part of the specification where appropriate.

The inventor found after study that, a lower color gamut is caused by reducing the thickness of a color filter for improving the out-screen brightness, and by using other solutions to effectively improve the out-screen brightness, a thick color filter can be used, thereby improving the color gamut; moreover, improving the out-screen brightness also helps to improve the contrast of the display.

Therefore, the present disclosure proposes a technical solution capable of effectively improving the out-screen brightness.

FIG. 1 is a schematic diagram showing a structure of a liquid crystal display panel 10 according to some embodiments of the present disclosure.

As shown in FIG. 1, the liquid crystal display panel 10 comprises: a first substrate 100 and a second substrate 300 opposed to each other; a liquid crystal layer 200 located between the first substrate 100 and the second substrate 300; and a quantum dot layer 400 located on a side of the second substrate 300 away from the liquid crystal layer 200 and including a plurality of quantum dots (QD) of different dimensions. For the sake of description in combination with the accompanying drawings, the first substrate 100 is hereinafter referred to as a lower substrate, and the second substrate 300 is hereinafter referred to as an upper substrate.

In some embodiments, the upper substrate and the lower substrate are parallel glass substrates or flexible substrates such as polyimide film. The lower substrate is provided with a thin film transistor (TFT) and a variety of metal wirings (not shown in the figure). Under the control of a signal of the TFT on the lower substrate 100, orientations of the liquid crystal molecules in the liquid crystal layer 200 (also referred to as "liquid crystal cell") between the upper substrate 300 and the lower substrate 100 can be changed to control whether the polarized light of each pixel is emitted or not, for the purpose of display. In some embodiments, both the upper and lower sides of the liquid crystal layer are provided with a polarizer, that is, an upper polarizer and a lower polarizer are arranged respectively between the liquid crystal layer and the upper and lower substrates.

Above the upper substrate 300, i.e., on a side of the upper substrate 300 away from the liquid crystal layer 200, a quantum dot layer 400 comprising a plurality of quantum dots of different dimensions is further arranged, as shown in FIG. 1. A quantum dot is a low dimensional semiconductor material on the order of nanometers, and may be spherical or sphere-like. When excited by electricity or light, the quantum dot will emit light with a specific wavelength.

Figure 2:
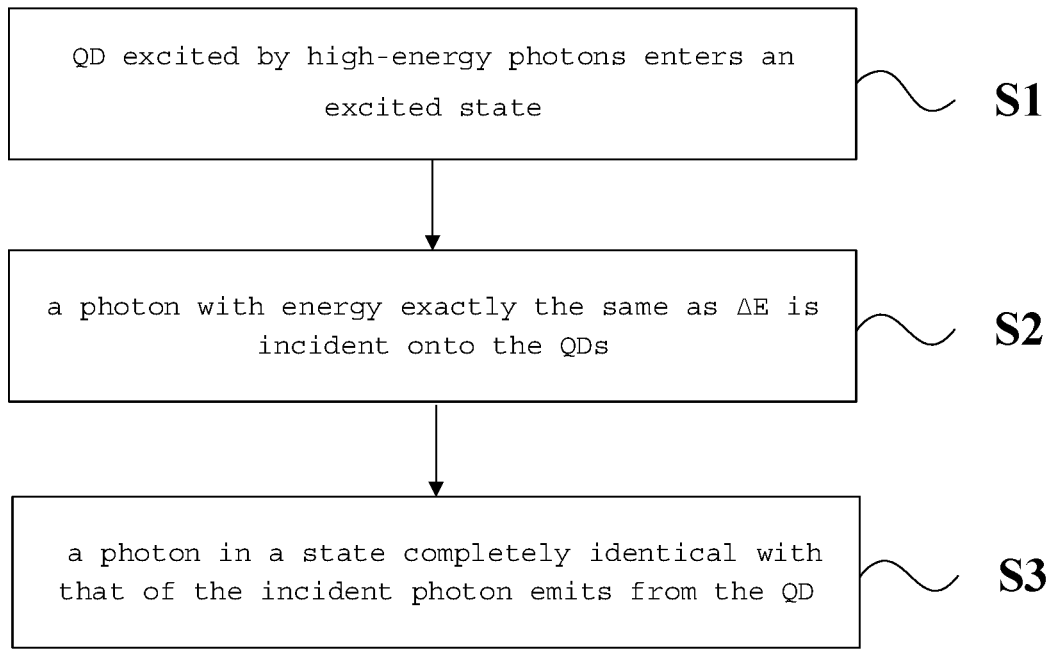
FIG. 2 is a flowchart showing the principle for excited radiation of quantum dots.

FIG. 2 is flowchart showing the principle for excited radiation of quantum dots.

As shown in FIG. 2, the excited radiation of QD can be divided into three steps. In a step S1, a QD is irradiated with high-energy photons, and since the energy (hv) of the high-energy photons is greater than an energy level difference ($\Delta E$) of QDs, i.e., hv>$\Delta E$, the QD is excited by the high-energy photons and enters the excited state. In a step S2, a photon with energy exactly the same as $\Delta F$ is incident onto the QD. In a step S3, the QD emits a photon in a state completely identical with that of the incident light state (e.g., phase, polarization, etc.), that is, the QD emits light with a specific wavelength. The wavelength of light that can be emitted from a quantum dot varies with the dimensions of the quantum dot, i.e., $\Delta E$ depends on the dimensions of the quantum dot. In addition, the material and shape of the quantum dot may also affect the wavelength of the light emitted.

Herein, semiconductor material that form the quantum dots may comprise IV, II-VI, IV-VI or III-V group elements.

For example, the quantum dots may be silicon quantum dots, germanium quantum dots, cadmium sulfide quantum dots, cadmium selenide quantum dots, cadmium telluride quantum dots, zinc selenide quantum dots, lead sulfide quantum dots, lead selenide quantum dots, indium phosphide quantum dots or indium arsenide quantum dots, etc.

Figure 3:
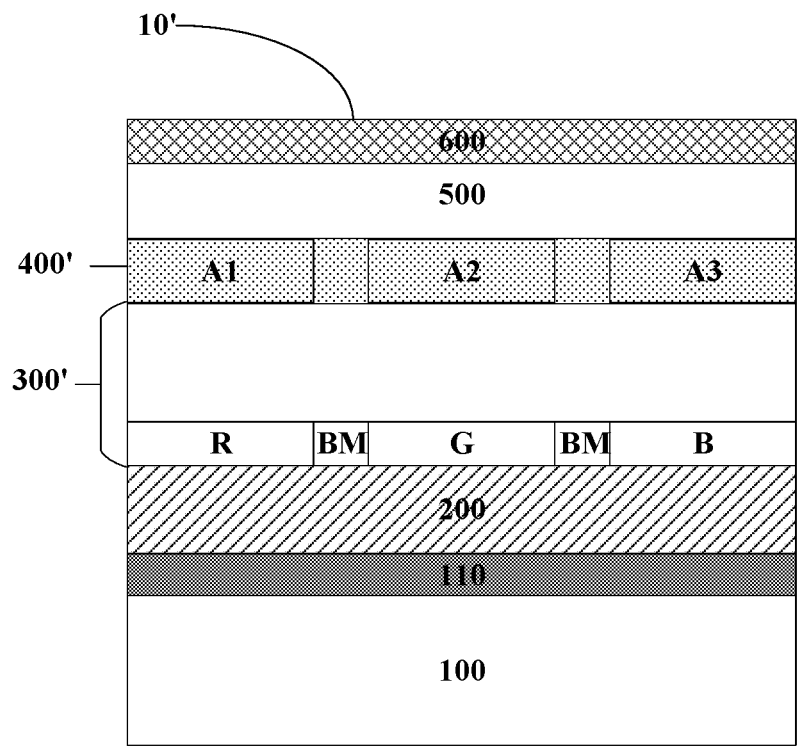
FIG. 3 is a schematic diagram showing a structure of a liquid crystal display panel according to some other embodiments of the present disclosure.

FIG. 3 is a schematic diagram showing a structure of a liquid crystal display panel 10' according to some other embodiments of the present disclosure.

The liquid crystal display panel 10' shown in FIG. 3 shows a further exemplary structure of the liquid crystal display panel 10 shown in FIG. 1.

In some embodiments, the upper substrate 300' comprises a first filter pattern, a second filter pattern, and a third filter pattern. For example, a different color filter can be arranged respectively in a respective region of the upper substrate to achieve respective optical filtering, e.g., R, G, B regions shown in FIG. 3. The R, G, and B regions respectively comprise red, green, and blue light filter materials. The R, G, and B regions respectively correspond to one sub-pixel, and they as a whole correspond to one pixel. In some other embodiments, the filter patterns may also not be part of the upper substrate 300', but serve as a filter layer between the quantum dot layer and the liquid crystal layer. A black matrix may be further arranged between the filter patterns, e.g., BM between the R, G, and B regions as shown in FIG. 3. The black matrix can avoid interference between different colors of light.

In some embodiments, the quantum dot layer 400' comprises a first region, a second region and a third region, positions of which correspond to positions of the first filter pattern, the second filter pattern, and the third filter pattern, respectively. As shown in FIG. 3, the quantum dot layer 400' comprises A1, A2, and A3 regions corresponding to the R, G, and B regions respectively. Orthographic projections of the R, G, and B regions on the substrate surface (for example, the surface of 100) respectively coincide with those of the A1, A2, and A3 regions on the substrate surface. The dimensions of the quantum dots in the A1, A2 and A3 regions correspond to the wavelength of light that can pass through R, G and B regions respectively.

In some embodiments, the liquid crystal display panel 10' further comprises a light guide layer 500 located on a side of the quantum dot layer 400' away from the liquid crystal layer, as shown in FIG. 3. The light guide layer 500 may be a light guide plate arranged above the quantum dot layer, and configured to guide light into the quantum dot layer. The light guide plate can convert a point or line light source into a surface light source. After the blue or ultraviolet light with a single wavelength enters the quantum dot layer via the light guide plate, the quantum dots can be excited to an excited state.

When the liquid crystal panel is a reflective display panel, the liquid crystal display panel may further comprise a reflective layer located on a side of the liquid crystal layer away from the filter layer. In this case, the reference number 110 shown in FIG. 3 denotes the reflective layer. The reflective layer may be located between the lower substrate (i.e., the first substrate) 100 and the liquid crystal layer 200. In some embodiments, the reflective layer may also be part of the lower substrate. For example, when the lower substrate adopts a reflective metal material, a separate reflective layer is no longer required. In some embodiments, the lower polarizer is arranged above the reflective layer (not shown in the figure). In some other embodiments, the reflective layer can also be fabricated into metal wire grids. In this case, the metal wire grids serve as both the reflective layer and the lower polarizer.

In the case of reflective display, after the ambient light is incident to the quantum dot layer, since an excited radiation occurs at the quantum dots of different dimensions in the excited state, the brightness of the light incident to the quantum dot layer is magnified. The light is reflected by the reflective layer after passing through the quantum dot layer, and the reflected light is emitted after the brightness thereof is magnified when passing through the quantum dot layer again. In other words, in the case of reflective display, the ambient light is magnified twice by the quantum dot layer, thereby significantly increasing the brightness of the emitted light.

When the liquid crystal display panel adopts transmissive display, the liquid crystal display panel may further comprise a transmissive layer located on a side of the liquid crystal layer away from the filter layer. In this case, the reference number 110 shown in FIG. 3 denotes a transmissive layer. The transmissive display generally does not use ambient light, but uses a backlight source. The light from the backlight source is incident to the quantum dot layer after passing through the transmissive layer, and since an excited radiation occurs at the quantum dots of different dimensions in the excited state, the brightness of the light incident to the quantum dot layer is magnified, thereby increasing the brightness of the emitted light.

Of course, the liquid crystal display panel may also adopt transflective display, for example, the liquid crystal display panel may comprise a transflective layer on a side of the liquid crystal layer away from the filter layer. In this case, the reference number 110 shown in FIG. 3 denotes the transflective layer. When the ambient light is stronger, the backlight source can be turned off and the reflection of the transflective layer is utilized for the display. When the ambient light is weaker, the backlight source can be turned on and the transmission of the transflective layer is utilized for the display.

In the above embodiments, no matter whether the liquid crystal display panel adopts reflective display or transmissive display, or transflective display in the combination of the two, by arranging a plurality of quantum dots of different dimensions on a side of the upper substrate away from the liquid crystal layer, the brightness of the emitted light can be increased. Moreover, since the brightness of the light passing through the quantum dot layer is magnified so that the display brightness is effectively increased, it is not needed to sacrifice the thickness of the color filter (i.e., the layer where the R, G, and B regions located) for increasing the brightness, in other words, a color filter layer with a conventional thickness can be adopted to ensure purity of the color, to thereby improve the color gamut.

In some embodiments, the liquid crystal display panel 10' further comprises: a protective layer 600 located on a side of the quantum dot layer 400' away from the liquid crystal layer 200, and configured to prevent the blue or ultraviolet light from being emitted from the liquid crystal panel. Because the blue or ultraviolet light is not good for human eyes, a protective layer can be added on the outermost side of the Liquid crystal display panel to absorb part of the blue or ultraviolet light, thereby reducing the blue or ultraviolet light emitted from the liquid crystal display panel. This can avoid hurting the user's eyes or avoiding discomforting the eyes, and will not affect the light magnification effect of the quantum dot layer, nor will it significantly affect the display effect.

Figure 4:
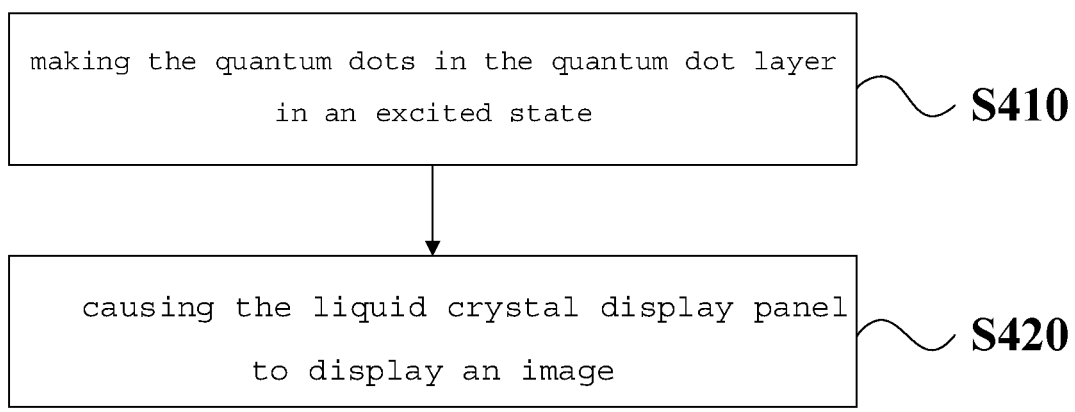
FIG. 4 is a flowchart showing a display method of a liquid crystal display panel according to some embodiments of the present disclosure.

FIG. 4 is a flowchart showing a display method of a liquid crystal display panel according to some embodiments of this disclosure.

As shown in FIG. 4, the display method comprises: a step 410 of making the quantum dots in the quantum dot layer in an excited state, and a step 420 of causing the liquid crystal display panel to display an image.

In the step 410, the quantum dot layer is illuminated by the blue or ultraviolet light with a single wavelength, to cause the quantum dots to be in an excited state. In the step 420, the quantum dot layer is illuminated with the ambient light or backlight source. Because of the light magnification function of the quantum dot layer, the out-screen brightness of the liquid crystal display panel is increased, which improves the contrast of the image display. Moreover, because the out-screen brightness has been increased by the light magnification function of the quantum dots, a thick color filter layer can be used to thereby improve the color gamut. That is, through such a display method, the display effect of the liquid crystal display panel is improved remarkably.

The embodiments of this disclosure further provides a display device comprising any of the liquid crystal display panels described above. The display device may be: mobile phone, tablet, television set, monitor, notebook computer, digital photo frame, navigator, or any product or component with the display function.

Figure 5:
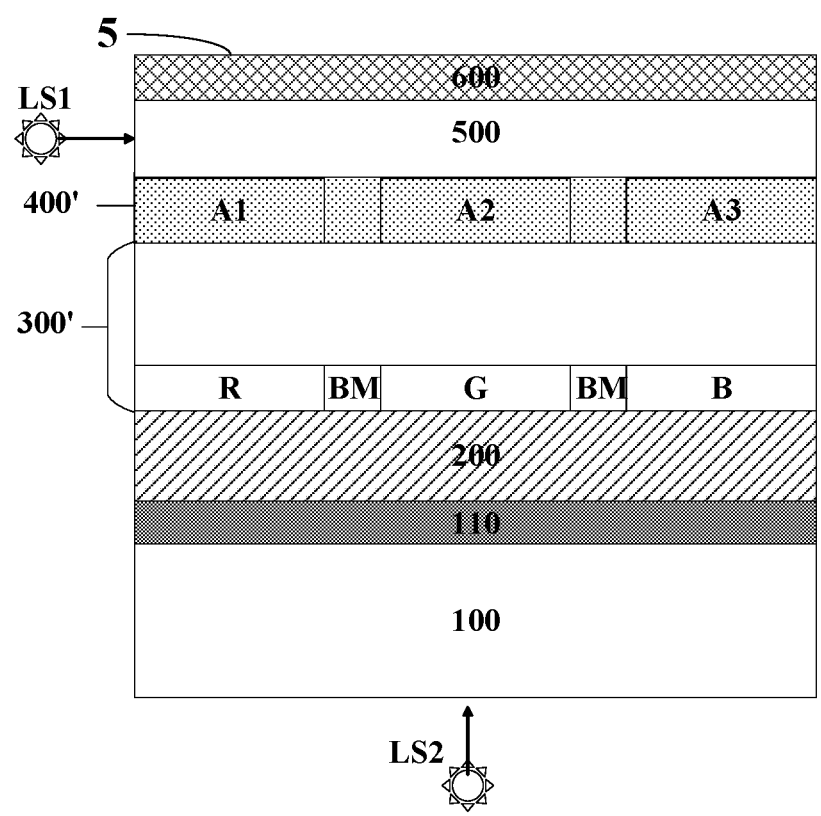
FIG. 5 is a schematic diagram showing a structure of a display device according to some embodiments of the present disclosure.

FIG. 5 is a schematic diagram showing a structure of a display device 5 according to some embodiments of this disclosure.

As shown in FIG. 5, the display device 5 comprises a first light source LS1, in addition to the liquid crystal display panel 10' shown in FIG. 3. In some embodiments, the first light source LS1 is located on a side of the second substrate 300' (i.e., the upper substrate) away from the liquid crystal layer 200. As shown in FIG. 5, the first light source LS1 can be on a side surface of the liquid crystal display panel 10', and thus is also referred to as a side light source. The first light source LS1 is configured to emit blue or ultraviolet light with a single wavelength to excite the quantum dots in the quantum dot layer to an excited state. In some embodiments, the first light source LS1 is turned off when it is not needed to display an image; and the first light source LS1 is turned on to excite the quantum dots when it is needed to display an image, to thereby achieve light magnification, significantly increase the display brightness and improve contrast.

In some embodiments, the blue or ultraviolet light emitted from the first light source LS1 changes its direction after passing through the light guide plate 500, and then enters the quantum dot layer 400' to excite the quantum dots to an excited state, as shown in FIG. 5.

In some embodiments, such as in the case of reflective display, the display device does not need other light sources but uses the ambient light. In this case, after the ambient light is irradiated onto the quantum dot layer, the brightness is magnified, and after the light is reflected by the reflective layer and passes through the quantum dot layer again, the brightness is magnified for the second time, and thereafter emitted from the screen.

In some embodiments, for example, in the case of transmissive display or transflective display, the display device further comprises a second light source LS2. In some embodiments, the second light source LS2 is located on a side of the first substrate 100 (lower substrate) away from the liquid crystal layer 200. As shown in FIG. 5, the second light source LS2 may be on a back surface of the liquid crystal display panel 10', and thus also referred to the backlight source. In some other embodiments, for example, in the case of transparent display, the second light source LS2 may also be located on a side of the second substrate (i.e., the upper substrate) away from the liquid crystal layer 200.

In some embodiments, the second light source is configured to emit white light, which becomes a color light after passing through a filter. These color lights are magnified in brightness after passing though the quantum dot layer and are emitted from the screen. Herein, the second light source can emit not white light, but light of other colors, as long as the light emitted therefrom, after passing through the filter, is changed into a light including for example, red, green, and blue colors.

In some embodiments, the first and second light sources both are located on a back surface of the liquid crystal display panel. In this case, the first light source and the second light source may alternately emit light to achieve the display of light magnification. In some other embodiments, only the backlight source is adopted, but the backlight source can alternately emit light to thereby achieve the display of light magnification.

In the above embodiments, by arranging the quantum dot layer on a side of the second substrate (also referred to as the upper substrate) away from the first substrate (also referred to as lower the substrate), light magnification is achieved by use of photo-excitation, thereby increasing the out-screen brightness, thus improving the contrast and color gamut.

So far, the embodiments of this disclosure have been described in detail. In order to avoid obscuring the idea of this disclosure, some details well known in the art are omitted. A person skilled in the art can fully understand how to implement the technical solutions disclosed herein according to the above description.

Although some specific embodiments of the present disclosure have been described in detail with examples, it should be understood by a person skilled in the art that the above examples are only intended to be illustrative but not to limit the scope of the present disclosure. The above embodiments can be modified or partial technical features thereof can be equivalently substituted without departing from the scope and spirit of the present disclosure. The scope of the present disclosure is defined by the attached claims.

What is claimed is:

1. A liquid crystal display panel comprising:
   a first substrate and a second substrate opposed to each other;
   a liquid crystal layer located between the first substrate and the second substrate;
   a quantum dot layer located on a side of the second substrate away from the liquid crystal layer, and comprising a plurality of quantum dots of different dimensions;
   a light guide layer located on a side of the quantum dot layer away from the liquid crystal layer, and configured to guide light into the quantum dot layer, wherein the light is blue or ultraviolet light with a single wavelength for making the quantum dots in an excited state; and
   a protective layer located on a side of the quantum dot layer away from the liquid crystal layer, and configured to reduce the blue or ultraviolet light emitted from the liquid crystal display panel.

2. The liquid crystal display panel according to claim 1, wherein a material for the first substrate comprises a reflective metal material.

3. The liquid crystal display panel according to claim 1, wherein a material for the quantum dots comprises at least one selected from a group consisting of IV, II-VI, III-V, and IV-VI group elements.

4. The liquid crystal display panel according to claim 1, further comprising:
polarizer layers respectively located on opposite sides of the liquid crystal layer.

5. The liquid crystal display panel according to claim 1, further comprising:
a filter layer located between the quantum dot layer and the liquid crystal layer, wherein the filter layer comprises a first filter pattern, a second filter pattern, and a third filter pattern.

6. The liquid crystal display panel according to claim 5, further comprising:
a transflective layer located on a side of the liquid crystal layer away from the filter layer.

7. The liquid crystal display panel according to claim 5, further comprising:
a transmissive layer located on a side of the liquid crystal layer away from the filter layer.

8. The liquid crystal display panel according to claim 5, wherein:
the quantum dot layer comprises a first region, a second region and a third region, positions of which correspond to positions of the first filter pattern, the second filter pattern and the third filter pattern respectively,
the dimensions of the quantum dots in the first region, the second region and the third region respectively correspond to a wavelength of the light capable of passing through the first filter pattern, the second filter pattern and the third filter pattern.

9. The liquid crystal display panel according to claim 8, wherein orthographic projections of the first region, the second region and the third region on a plane of the first substrate respectively coincide with those of the first filter pattern, the second filter pattern and the third filter pattern.

10. The liquid crystal display panel according to claim 5, further comprising: a reflective layer located on a side of the liquid crystal layer away from the filter layer.

11. The liquid crystal display panel according to claim 10, wherein the reflective layer is metal wire grids.

12. A display device comprising:
the liquid crystal display panel according to claim 1.

13. The display device according to claim 12, further comprising:
a source located on a side of the first substrate away from the liquid crystal layer, and configured to alternately emit white light and blue or ultraviolet light with a single wavelength.

14. The display device according to claim 12, further comprising:
a first light source located on a side of the second substrate away from the liquid crystal layer, and configured to emit blue or ultraviolet light with a single wavelength.

15. The display device according to claim 14, further comprising:
a second light source located on a side of the first substrate away from the liquid crystal layer, and configured to emit white light.

16. A display method of a liquid crystal display panel comprising a liquid crystal layer located between a first substrate and a second substrate opposed to each other and a quantum dot layer located on a side of the second substrate away from the liquid crystal layer, the quantum dot layer comprising a plurality of quantum dots of different dimensions, a light guide layer located on a side of the quantum dot layer away from the liquid crystal layer and configured to guide light, which is blue or ultraviolet light with a single wavelength for making the quantum dots in an excited state, into the quantum dot layer, and a protective layer located on a side of the quantum dot layer away from the liquid crystal layer and configured to reduce the blue or ultraviolet light emitted from the liquid crystal display panel, the display method comprising:
making the quantum dots in the quantum dot layer in an excited state; and
causing the liquid crystal display panel to display an image.

17. The display method according to claim 16, wherein the quantum dot layer is illuminated by the blue or ultraviolet light with a single wavelength, to make the quantum dots in an excited state.

* * * * *